United States Patent [19]

Ihara et al.

[11] Patent Number: 5,789,504

[45] Date of Patent: Aug. 4, 1998

[54] PROCESS FOR PREPARING LOW MOLECULAR WEIGHT POLYTETRAFLUOROETHYLENE

[75] Inventors: Kiyohiko Ihara; Kazuhiro Nakai; Yoshiki Maruya, all of Osaka, Japan

[73] Assignee: Daikin Industries, Ltd., Osaka, Japan

[21] Appl. No.: 619,654

[22] PCT Filed: Sep. 22, 1994

[86] PCT No.: PCT/JP94/01558

§ 371 Date: Mar. 22, 1996

§ 102(e) Date: Mar. 22, 1996

[87] PCT Pub. No.: WO95/08580

PCT Pub. Date: Mar. 30, 1995

[30] Foreign Application Priority Data

Sep. 24, 1993 [JP] Japan ............................ 5-237774

[51] Int. Cl.⁶ ............................................. C08F 2/00
[52] U.S. Cl. ................................ 526/206; 526/255
[58] Field of Search ........................... 526/206, 255

[56] References Cited

U.S. PATENT DOCUMENTS

| | | |
|---|---|---|
| 3,067,262 | 12/1962 | Brady . |
| 5,182,342 | 1/1993 | Feiring et al. ............ 526/247 |
| 5,281,680 | 1/1994 | Grot ........................ 526/206 |
| 5,310,870 | 5/1994 | Peavy ...................... 526/206 |

FOREIGN PATENT DOCUMENTS

| | | |
|---|---|---|
| 0 638 596 A1 | 2/1995 | European Pat. Off. . |
| 934 309 | 10/1955 | Germany . |
| 5-224556 | 7/1977 | Japan . |
| 5-722043 | 5/1982 | Japan . |
| 2155907 | 6/1990 | Japan .............. 526/206 |
| 317106 | 1/1991 | Japan . |
| 6-157617 | 6/1994 | Japan . |
| 6-157675 | 6/1994 | Japan . |
| 6-211933 | 8/1994 | Japan . |
| 6-271607 | 9/1994 | Japan . |
| 0781532 | 8/1957 | United Kingdom ........ 526/206 |

OTHER PUBLICATIONS

Cheimcal Abstracts 121:231656, Jul. 5, 1994.
Chemical Abstracts 71:22454, Mar. 31, 1969.
"The CFC–Ozone Issue: Progress on the Development of Alternatives to CFCs" by L.E. Manzer, Science 249, pp. 31–35 (1990).

Primary Examiner—Joseph L. Schofer
Assistant Examiner—N. Sarofim
Attorney, Agent, or Firm—Birch, Stewart, Kolasch & Birch, LLP

[57] ABSTRACT

A process for preparing low molecular weight polytetrafluoroethylene having a melting point of 250° C. to 325° C. comprising polymerizing tetrafluoroethylene in at least one polymerization solvent selected from the group consisting of hydrochlorofluorocarbons, hydrofluorocarbons and perfluorocarbons which have boiling points in the range between −10° C. and 70° C. under constant pressure by the supplement of tetrafluoroethylene. According to this process, the low molecular weight polytetrafluoroethylene which is useful as an additive to various materials is produced in the solvent which has a low ozone destruction factor or does not destroy the ozone, under economically advantageous low pressure which can be controlled safely.

13 Claims, No Drawings

PROCESS FOR PREPARING LOW MOLECULAR WEIGHT POLYTETRAFLUOROETHYLENE

FIELD OF THE INVENTION

The present invention relates to a process for preparing low molecular weight polytetrafluoroethylene (hereinafter referred to as "low molecular weight PTFE").

DESCRIPTION OF THE CONVENTIONAL ART

Low molecular weight PTFE is not used in the form of a molded article, since it is PTFE having a molecular weight of several thousand to several hundred thousand ($60\times10^4$ or less) so that its mechanical strength is very low. But, fundamentally, it maintains the functions of PTFE such as lubricating properties, water repellency, and so on, and is added to other plastics, rubbers, paints, greases, etc. to impart the lubricating properties, water repellency, and so on to surface properties of such materials. In such case, the low molecular weight PTFE is used in a form of fine powder having a particle size of several micrometers to several ten micrometers, or a dispersion in various solvents.

Hitherto, as a preparation process of the low molecular weight PTFE, conventional polymerization methods, pyrolysis of high molecular weight PTFE, decomposition by irradiation, and the like are known. As the polymerization method, there are known a method comprising telomerization of tetrafluoroethylene in a solvent, and an emulsion polymerization method.

As a prior art relating to the telomerization of tetrafluoroethylene in the solvent, only U.S. Pat. No. 3,067,262 is known. Basically, this method comprises polymerizing tetrafluoroethylene in the presence of an active telogen and a free radical generator dissolved in trichlorotrifluoroethane, that is, tetrafluoroethylene is polymerized in the presence of 1.7 to 15 moles of trichlorotrifluoroethane, 0.01 to 0.6 mole of the active telogen, both per one mole of tetrafluoroethylene, and 0.05 to 3 wt. % of the free radical generator based on the weight of tetrafluoroethylene. A reaction temperature is in the range between 75° C. and 200° C., and pressure is from 200 to 600 psig.

The production of the polymerization solvent trichlorotrifluoroethane known from the above prior art is banned by the end of 1995 because of the destruction of the ozone layer, and the selection of a substitute solvent therefor is necessary.

When the polymerization is performed under the above conditions, a temperature control in a batchwise reaction is very difficult in an initial stage of the polymerization in which a tetrafluoroethylene concentration is highest, because of the vary rapid polymerization. In particular, the polymerization is very difficult at a relatively low polymerization temperature of 100° C. or lower in which the temperature can be controlled by warm water which is preferred from the economical view point.

It is described to maintain a constant pressure by supplementing necessary components including tetrafluoroethylene at the same time as the continuous removal of a reaction product from a reaction system. But, since the polymerization pressure is very high, for example, 400 to 600 psig, it is dangerous for operation.

SUMMARY OF THE INVENTION

The present invention solves the above problems of the conventional art, and provides a process for preparing low molecular weight PTFE by polymerizing tetrafluoroethylene in a solvent which is a substitute for trichlorotrifluoroethane and which has a low ozone destruction factor or does not destroy the ozone, under economically advantageous low pressure which can be controlled safely.

According to an aspect of the present invention, there is provided a process for preparing low molecular weight polytetrafluoroethylene having a melting point of 250° C. to 325° C. comprising polymerizing tetrafluoroethylene in at least one polymerization solvent selected from the group consisting of hydrochlorofluorocarbons, hydrofluorocarbons and perfluorocarbons which have boiling points in the range between −10° C. and 70° C. under constant pressure by the supplement of tetrafluoroethylene.

DETAILED DESCRIPTION OF THE INVENTION

In the present invention, at least one polymerization solvent selected from the group consisting of hydrochlorofluorocarbons, hydrofluorocarbons and perfluorocarbons which have boiling points in the range between −10° C. and 70° C. is used as a polymerization solvent.

In principle, the polymerization solvent should be a good solvent for tetrafluoroethylene. Preferably, the solvent does not induce or hardly induces a chain transfer reaction. When the solvent has a large chain transfer constant, the product has a very low molecular weight, or the polymerization reaction is very slow. Then, it is necessary to increase a molar ratio of tetrafluoroethylene to the solvent, and as a result, a very high pressure is necessitated. Thereby, a low pressure reaction, which is an object of the present invention, cannot be achieved.

As a result of various studies, it has been found that hydrocarbons cannot be used since their chain transfer constants are too large, while the hydrochlorofluorocarbons, the hydrofluorocarbons or the perfluorocarbons are suitable. These compounds are known to have the low ozone destruction factor or not to destroy the ozone, and preferred in view of the preservation of global environment. Among these compounds, those having as low vapor pressure as possible are preferred to perform the polymerization under the low pressure. On the other hand, those having a boiling point of −10° C. to 70° C. are preferred since the low boiling point is desired to replace them with other solvent which will be explained below. Examples of such solvents are perfluorocyclobutane, perfluorobutane, dichlorotrifluoroethane, dichlorofluoroethane, 1,4-dihydrooctafluorobutane, perfluorohexane, and the like. In particular, dichlorofluoroethane is preferred.

An amount of the solvent in relation to the monomer is not critical. The solvent is preferably used in an amount that the monomer concentration in the polymerization system is preferably from 0.5 to 15 wt. %, more preferably from 1 to 5 wt. %.

A volume of the solvent depends on an internal volume of a reaction vessel, and is usually charged in the range between 50% to 70% of the internal volume.

In the process of the present invention, a telogen may be added to the reaction system. As the telogen, the compounds disclosed in above U.S. Pat. No. 3,067,262 may be used. Preferred examples of the telogen are cyclohexane, methylcyclohexane, and so on. When the polymerization pressure is set low, the telogen may not be used.

An amount of the telogen is determined according to a ratio of the telogen to the concentration of tetrafluoroethylene based on a chain transfer reactivity of the telogen and an intended molecular weight of the low molecular weight PTFE. The amount of the telogen is usually from 0 to 0.5 mole, preferably from 0 to 0.2 mole per one mole of tetrafluoroethylene.

As a polymerization initiator, a radical polymerization initiator is used. A preferred polymerization initiator is an organic peroxide. Examples of the organic peroxide are diacylperoxides, peroxyesters, peroxydicarbonates, and so on. Among them, diisopropyl peroxydicarbonate, di-n-propyl peroxydicarbonate, and so on are preferred.

An amount of the polymerization initiator is not limited, and is preferably from 0.05 to 5 wt. % based on the weight of tetrafluoroethylene. When the amount of the polymerization initiator is too large in relation to tetrafluoroethylene present, the molecular weight tends to be too low, while when it is too small, the reaction time is prolonged.

For example, the polymerization may be performed as follows:

First, the polymerization solvent is charged in a pressure reaction vessel equipped with a stirrer, and then, a defined amount of tetrafluoroethylene and optionally a defined amount of the telogen are charged. Thereafter, the polymerization initiator is added to initiate the polymerization. A timing of the addition of the polymerization is before or after the adjustment of an internal temperature to a desired temperature. After the initiation of the polymerization, the internal temperature is maintained at the defined temperature. After the initiation of the polymerization, since the internal pressure drops with the progress of the polymerization, tetrafluoroethylene is supplemented. If necessary, the telogen and the polymerization initiator are additionally added. When a determined amount of tetrafluoroethylene is charged, the polymerization is terminated. In some cases, it is possible to continue the polymerization till the internal pressure drops to a specific pressure after charging the determined amount of tetrafluoroethylene. Thereafter, the content in the reactor is cooled, and a dispersion of the low molecular weight PTFE in the solvent is discharged.

The polymerization temperature is preferably in a range in which the temperature can be controlled with warm water. Then, a temperature of 100° C. or lower is selected. A preferred temperature range is from 50° C. to 80° C.

The polymerization pressure is preferably 15 kg/cm$^2$G in view of the safety since tetrafluoroethylene is continuously supplemented. In particular, a pressure of 10 kg/cm$^2$G or lower is preferred.

The resulting dispersion of the low molecular weight PTFE in the solvent has good dispersion stability, and can be obtained in the form of a high concentration dispersion, and used as such.

When it is desired to change such dispersion of the low molecular weight PTFE to a dispersion in a high boiling organic solvent which is preferred in use, an organic solvent with which the polymerization solvent is replaced is added to the dispersion of the low molecular weight PTFE in the polymerization solvent, and thereafter, the solvent used in the polymerization is evaporated off. Examples of the organic solvent to be used in such replacement are hydrocarbons, alcohols such as ethanol, propanol, butanol, etc., ketones such as methyl ethyl ketone, esters such as ethyl acetate, butyl acetate, etc., and the like.

When it is desired to isolate the solid low molecular weight PTFE from the dispersion in the polymerization solvent, the solvent which is used in the polymerization is evaporated off. Since particle sizes are increased by agglomeration, the agglomerated particles are ground after the removal of the solvent to obtain the fine powder. As an advantageous method for simplifying the step, spray drying is used to obtain the fine powder directly.

When a terminal group of the low molecular weight PTFE should be stabilized, the fine powder can be contacted to a fluorine gas after the removal of the solvent for stabilization.

When the terminal group is a carbonate group, or a carboxylic acid or carbonyl halide group, it can be stabilized by amidation with ammonia, or esterification with an alcohol.

The PTFE obtained by the process of the present invention has a low molecular weight, and a melting point in the range between 250° C. and 325° C. Herein, a melting point means an endothermic peak temperature when 10 mg of the solid polymer obtained by the evaporation off of the solvent from the dispersion which is prepared by the polymerization is heated in a differential scanning calorimeter (DSC) at a heating rate of 10° C./min.

EXAMPLES

The present invention will be illustrated by the following examples, which do not limit the present invention in any way.

Example 1

In a 3 liter stainless steel pressure reaction vessel equipped with a stirrer, dichlorofluoroethane (2000 g) was charged. Then, tetrafluoroethylene (70 g) and cyclohexane (3.4 g) were charged, and further di-n-propyl peroxydicarbonate (1.3 g) was added. Thereafter, an internal temperature was raised to 60° C. At that time, a pressure was 4 kg/cm$^2$G. As the pressure dropped with the progress of the polymerization, tetrafluoroethylene was continuously charged to maintain the pressure. The internal temperature was kept at 60° C. When the polymerization was performed for 5 hours, the amount of additionally charged tetrafluoroethylene reached 210 g. After then, the internal temperature was lowered to 20° C., and unreacted tetrafluoroethylene was purged to terminate the polymerization. A content in the vessel was a homogeneous dispersion having a solid content of 10.7 wt. %. A melting point of the solid was 309.5° C.

As described above, a melting point used herein means an endothermic peak temperature when 10 mg of the solid polymer obtained by the evaporation off of the solvent from the dispersion which is prepared by the polymerization is heated in a differential scanning calorimeter (DSC) at a heating rate of 10° C./min.

Example 2

In the same manner as in Example 1 except that no cyclohexane was added, the polymerization was performed. When the polymerization was carried out for 5 hours, the amount of additionally charged tetrafluoroethylene reached 264 g. After then, the internal temperature was lowered to 200° C., and unreacted tetrafluoroethylene was purged to terminate the polymerization. A content in the vessel was a homogeneous dispersion having a solid content of 14.7 wt. %. A melting point of the solid was 321.3° C.

Example 3

In the same manner as in Example 1, after tetrafluoroethylene (150 g) and cyclohexane (7.3 g) were charged while stirring, di-n-propyl peroxydicarbonate (1.3 g) was added. Then, the internal temperature was raised to 60° C. At that time, a pressure was 8 kg/cm²G. As the pressure dropped with the progress of the polymerization, tetrafluoroethylene was continuously charged to maintain the pressure. The internal temperature was kept at 60° C. When the polymerization was performed for 5 hours, the amount of additionally charged tetrafluoroethylene reached 350 g. After then, the internal temperature was lowered to 20° C., and unreacted tetrafluoroethylene was purged to terminate the polymerization. A content in the vessel was a homogeneous dispersion having a solid content of 18.7 wt. %. A melting point of the solid was 311.2° C.

Example 4

In the same manner as in Example 1 except that perfluorocyclobutane was used in place of dichlorofluoroethane, and the polymerization was continued for 5 hours while maintaining the pressure to 10 kg/cm²G, the polymerization was performed. In this case, since the solvent had the boiling point of lower than 0° C., it was difficult to recover the reaction product stably in the form of a dispersion in the solvent from the reaction vessel. Therefore, after the termination of the polymerization, ethanol (2000 g) was added to the reaction vessel, and then unreacted tetrafluoroethylene and perfluorocyclobutane were evaporated off to obtain a dispersion in ethanol, which had a solid content of 9.7 wt. %. The solid had a melting point of 313.5° C.

Example 5

The dispersion prepared in Example 1 was charged in a glass flask equipped with a stirrer and a distillation column, and further toluene (900 g) was added. The mixture was heated while stirring to evaporate dichlorofluoroethane off to obtain a homogeneous dispersion in toluene. The solid content was 8.1 wt. %.

Comparative Example 1

In a 80 liter stainless steel pressure reaction vessel equipped with a stirrer, trichlorotrifluoroethane (70 kg) was charged and cooled to 0° C. Then, tetrafluoroethylene (15 kg) and 1,4-dioxane (0.65 kg) were charged while stirring, followed by addition of azobisisobutyronitrile (80 g) was added. At that time, an internal pressure was 2 kg/cm²G. Thereafter, steam was supplied through a jacket to raise the temperature to 130° C. At this point, the internal pressure was 20 kg/cm²G. With the progress of polymerization, the pressure dropped. After continuing the polymerization for 0.5 hour, the pressure dropped to 5 kg/cm²G. Then, after lowering the internal temperature to 200° C., unreacted tetrafluoroethylene was discharged to terminate the polymerization. The content in the vessel was a homogeneous dispersion having a solid content of 7 wt. %. The solid had a melting point of 309.3° C.

Comparative Example 2

In the same manner as in Example 1 except that methylene chloride (2150 g) was used in place of dichlorofluoroethane, an amount of initially charged tetrafluoroethylene was changed to 95 g, and no cyclohexane was used, the polymerization was performed. At the polymerization pressure of 6 kg/cm²G, the polymerization was continued for 5 hours during which tetrafluoroethylene (392 g) was added, and then the polymerization was terminated. The content in the vessel was white turbid, and a solid content was 16.0 wt. %. The solid had a melting point of 295° C.

While the dispersions obtained in Examples 1, 2 and 3 were translucent, the resulting dispersion of this Comparative Example was a white turbid one, and its solid content tended to precipitate. After being kept standing for one hour, a depth of a supernatant was about 50%. When dichlorofluoroethane was used, no precipitation was observed.

Evaluation of Dispersion Stability

Each of the dispersions obtained in Example 1 and Comparative Examples 1 and 2, and commercially available low molecular PTFE powder (L-5 manufactured by Daikin Industries Ltd.) was added to methyl ethyl ketone in an amount that a solid content was 5 wt. %, and stirred to disperse the polymer. Thereafter, a mode of sedimentation of the solid content was observed to evaluate the dispersion stability.

After the dispersion was kept standing for 10 minutes from the stirring and dispersing, a ratio of a supernatant volume to the whole volume was measured. The results are shown in the following Table. The dichlorofluoroethane solvent achieved the stability equal to or better than that achieved by the conventionally used trichlorotrifluoroethane solvent.

TABLE

| Dispersion | Solvent | Ratio of supernatant (%) |
| --- | --- | --- |
| Example 1 | Dichlorofluoroethane | 18 |
| Comp. Ex. 1 | Trichlorotrifluoroethane | 23 |
| Comp. Ex. 2 | Methylene chloride | 80 |
| Commercial product | — | 90 |

According to the present invention, the low molecular weight PTFE which is useful as an additive to various materials is produced in the solvent which has a low ozone destruction factor or does not destroy the ozone, under economically advantageous low pressure which can be controlled safely.

What is claimed is:

1. A process for preparing low molecular weight polytetrafluoroethylene having a melting point of 250° C. to 325° C. comprising polymerizing tetrafluoroethylene in at least one polymerization solvent selected from the group consisting of hydrochlorofluorocarbons and perfluorocarbons which have boiling points in the range between −10° C. and 70° C. under constant pressure by the supplement of tetrafluoroethylene.

2. The process according to claim 1, wherein said polymerization solvent is perfluorocyclobutane, perfluorobutane, dichlorotrifluoroethane, dichlorofluoroethane, or perfluorohexane.

3. The process according to claim 2, wherein said polymerization solvent is dichlorofluoroethane.

4. The process according to claim 1, wherein an organic peroxide is used as a polymerization initiator.

5. The process according to claim 1, wherein the polymerization is performed in the presence of a telogen.

6. The process according to claim 5, wherein said telogen is cyclohexane and/or methylcyclohexane.

7. The process according to claim 1, wherein a polymerization temperature is 100° C. or lower, and a polymerization pressure is 15 kg/cm²G or lower.

8. A process for preparing a dispersion of polytetrafluoroethylene in an organic solvent comprising adding an organic solvent which has a higher boiling point than a polymerization solvent to the dispersion of the low molecular weight polytetrafluoroethylene in the polymerization solvent prepared by the process claimed in any one of claims 1 to 6, and evaporating the polymerization solvent off to replace.

9. A method for producing a solid low molecular weight polytetrafluoroethylene comprising evaporating the polymerization solvent off from the dispersion of the low molecular weight polytetrafluoroethylene in the polymerization solvent prepared by the process claimed in any one of claims 1 to 6.

10. The process according to claim 1, wherein a polymerization temperature is 100° C. or lower.

11. The process according to claim 10, wherein the polymerization temperature is in the range between 50° C. and 80° C.

12. The process according to claim 1, wherein a polymerization pressure is 15 kg/cm$^2$G or lower.

13. The process according to claim 12, wherein the polymerization temperature is 10 kg/cm$^2$G or lower.

* * * * *